3,366,284
LIQUID METERING DISPENSER CONTAINER
Robert N. Marona, Scarsdale, N.Y., and Philip H. Huepenbecker, Orange, Conn., assignors to General Foods Corporation, White Plains, N.Y., a corporation of Delaware
Filed Apr. 13, 1966, Ser. No. 542,338
7 Claims. (Cl. 222—211)

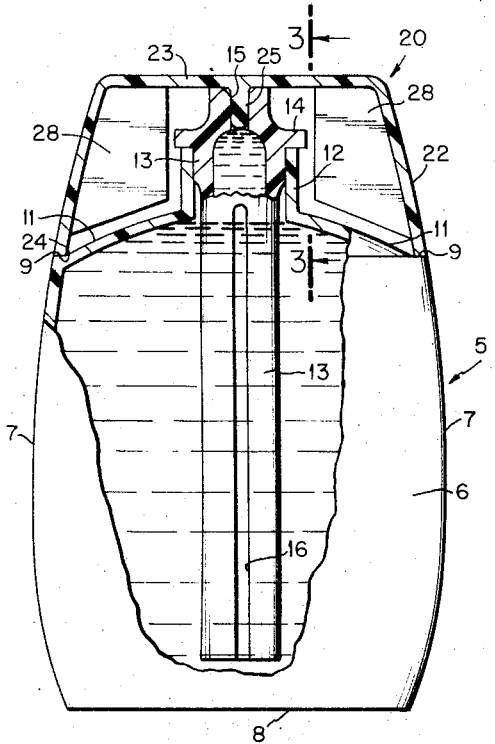
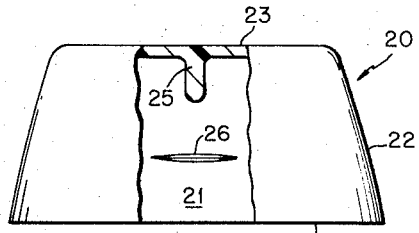
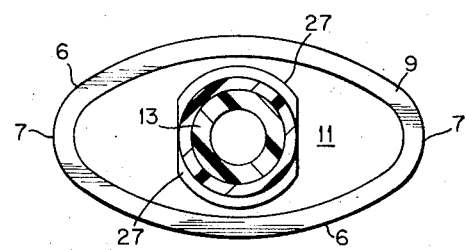
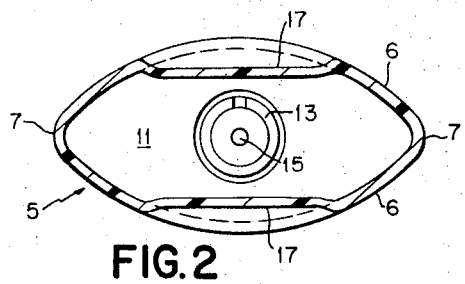
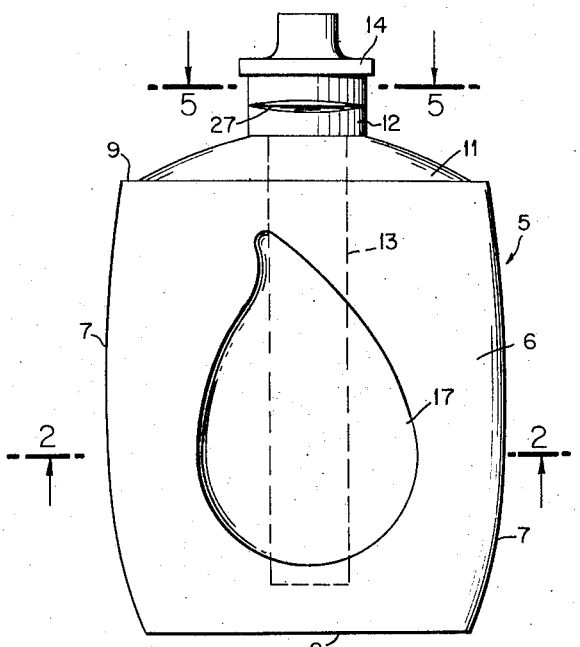
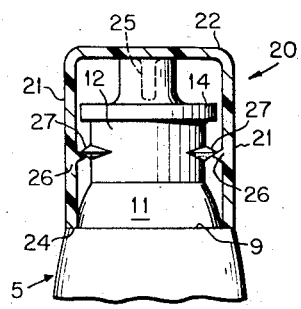
INVENTORS
ROBERT N. MARONA
PHILIP H. HUEPENBECKER

United States Patent Office 3,366,284
Patented Jan. 30, 1968

ABSTRACT OF THE DISCLOSURE

A plastic squeeze bottle of oval cross section is adapted to dispense its liquid contents in metered amounts. An interiorly disposed, vertically oriented perforate tube communicates with the dispensing orifice and limits the extent of sidewall flexure of the bottle so as to measure the amount of liquid contents which can be dispensed by a singe squeezing together of the sidewalls. A twist-off cap cooperating with the shoulder of the bottle seals the dispensing orifice when the bottle is not in use.

---

This invention relates to a liquid container capable of dispensing its liquid contents in closely regulated or metered amounts, the invention relating more particularly to such devices capable of dispensing, in response to manual actuation, different quantities of the container contents dependent upon the manner of actuation thereof.

There has long been a demand for a low-cost, reliable dispensing container for liquids which could meter precise quantities of the liquid as desired. The demand for such devices keeps increasing as more and more new products in liquid form and concentrated strength become available to the public at large for use in relatively small but accurately measured quantities.

The invention is herein disclosed in an embodiment designed to constitute a dispensing container intended to hold a concentrated relatively low viscosity liquid such as an artificial sweetener or the like and intended for personal use by being of such a size as to fit conveniently in the pocket or purse of the user. Due to the wide range of taste among the public at large with respect to the degree of sweetness desired for any given food product, such as a dispensing container should ideally be capable of operating to dispense as little as one drop of the product at a time or, alternatively, a stream comprising a quantity of the product equivalent to a predetermined number of drops. For example, in the case of a product of the type above mentioned, i.e., an artificial sweetener, the quantity of the product desired at any time may be equated with its equivalent amount of sugar. Assuming that the concentration of the product is such that ten drops thereof are the equivalent of one teaspoonful of sugar, thereby proportioning the dimensions of the device and its dispensing orifice so that when actuated in one manner ten drops of the product will be dispensed in a stream, the user can readily and easily obtain the equivalent of one teaspoon of sugar or possibly two or three as the case may be. In the event that the user wished quantities other than those represented by full increments of ten drops each, the device can be actuated in a different manner to dispense one drop at a time, thus enabling the consumer to obtain the precise quantity desired.

The embodiment of the invention disclosed herein is formed of a semiflexible material, preferably a plastic such as polyethylene and the like, to form a semirigid structure having flexible resilient characteristics. The structure comprises a bottle generally oval in cross section to minimize its bulk and thereby render it more suitable for carrying in the pocket or purse of the user, the walls of the bottle being resilient so as to flex under manual pressure for the purpose of dispensing the contents by displacement thereof caused by the flexure of the sidewalls. Due to the desired oval configuration of the container, the extent of flexure of the sidewalls will, unless provision is otherwise made, necessarily vary depending upon whether pressure is applied thereto along the major or minor axis of the oval configuration. In order to assure that the amount of liquid dispensed remains uniform in relation to the amount of pressure applied to the sidewalls, the sidewalls are formed to provide a pressure-locating area which guides the fingers of the user to the same area of the sidewalls each time that the device is used. Furthermore, means are provided interiorly of the bottle to limit the extent of flexure of the sidewalls so that no more than a predetermined amount of the liquid can be dispensed regardless of the amount of pressure applied thereto. In the event that a lesser amount of the contained product is desired below the maximum amount that may be dispensed in any one acutation, a lighter pressure applied to the pressure applying area will result in dispensing the product in a drop-by-drop manner. Thus the user may obtain any desired amount of the product by applying maximum pressure on the pressure-applying area of the sidewalls of the bottle to obtain a predetermined quantity, which would be dispensed in a stream, or any increment thereof by applying and maintaining a lighter pressure on the sidewall to dispense the product in drops which may be counted and then discontinued by release of pressure after the selected number of drops have been dispensed.

The device is also provided with a closure cap adapted for locking engagement with the bottle and having a stopper means cooperating with the dispensing orifice to seal same to prevent accidental dispensing or leakage of the product when carried in the pocket or purse of the user. The closure cap is adapted for attachment and removal through a twisting action whereby the parts due to their configuration unseat the stopper means from the dispensing orifice through a camming action which minimizes the amount of force necessary to adequately grip the bottle in removing and attaching the cap, thereby reducing the likelihood of inadvertent dispensing of the contained liquid in the process of attaching or removing the cap.

It is therefore an object of this invention to improve upon portable liquid containers adaptable for dispensing measured quantities of their contents.

It is the further object of this invention to provide a liquid metering dispenser container which is simplified in design, economical to manufacture and reliable in operation.

It is the further object of this invention to provide an improved liquid metering container dispenser and closure cap therefor which affords an improved seal for the contained product and which coact in a manner to minimize the risk of accidental dispensing of the contained liquid during application of the cap or removal thereof from the container.

Further objects of the invention, together with the features contributing thereto and the advantages accruing therefrom, will be apparent in the following description when read in conjunction with the drawing wherein:

FIG. 1 is a view of the device in side elevation with the closure cap attached thereto;

FIG. 2 is a sectional view thereof taken along the line 2—2 of FIG. 4;

FIG. 3 is a sectional view taken along the line 3—3 of FIG. 1;

FIG. 4 is a view of the device in side elevation with the closure cap removed;

FIG. 5 is a sectional view taken along the line 5—5 of FIG. 4;

FIG. 6 is a side elevational view of the closure cap removed from the container;

Figure 7:
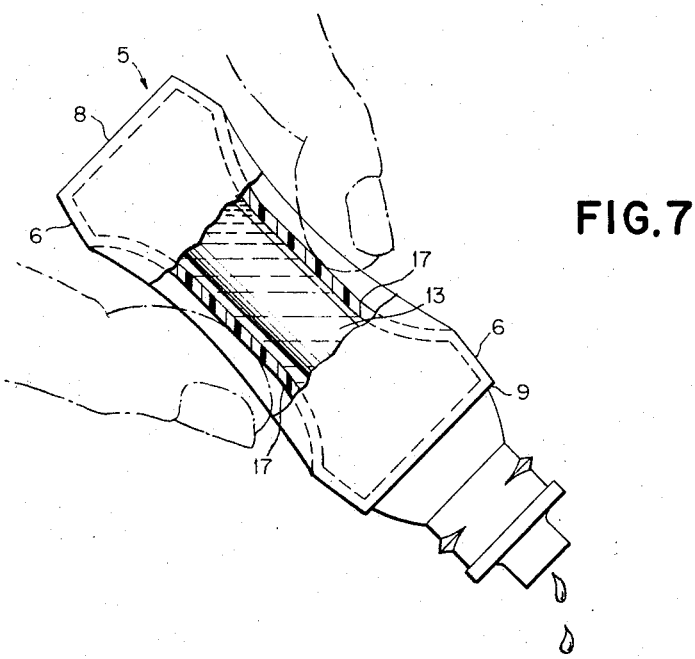
FIG. 7 is an operational view of the device when actuated in the manner to dispense the product one drop at a time.

Referring now to the drawing, it will be seen that the container portion of the device comprises a vial or bottle 5 which is of oval configuration in horizontal cross section and consisting of gradually curved opposed sidewalls 6 which meet in a relatively sharper curve at opposite ends of the major axis of the structure and which will be referred to as the endwalls 7 of the structure. The side and endwalls rise from the bottom 8 of the structure to a point where they are sharply recessed along a horizontal plane to define a peripheral step 9 from whence the respective walls incline along a shoulder portion 11 to converge at the base of a neck 12. The bottle is made of any suitable material having semirigid properties so as to render the sidewalls thereof somewhat flexible under manually applied forces, said material preferably being of plastic such as polyethylene or the like.

Inserted into the neck 12 of the bottle is a dispensing tube 13 having an exterior diameter near its upper end dimensioned to form a snug friction fit with the interior diameter of the neck 12. The tube extends inwardly along the vertical center line of the bottle to a point near the bottom thereof, the tube being open at its bottom end and providing an interior passage in free communication with the interior of the bottle. The upper end of the tube is formed with a flange 14 adapted to seat on the rim of the neck 12 and thereby limit the extent to which the tube may be inserted into the bottle. The top end of tube 13 is formed with a dispensing orifice 15 of reduced diameter relative to the inner diameter of the main portion of the tube and in communication therewith, through which orifice the liquid contents of the container or bottle are dispensed when inverted and squeezed as hereinafter more fully described.

The tube 13 is formed with an axially disposed slot 16 extending from its bottom extremity to near its top which assures communication between the interior of the tube and the interior of the bottle regardless of the level of the liquid contents therein to thereby prevent liquid from being trapped in the bottle when inverted and actuated in the manner hereinafter described. The tube is formed from any suitable material which will render it relatively inflexible and substantially rigid, said material being preferably of plastic such as linear polyethylene or the like, and is removably fitted to the neck of the bottle so that the bottle may be refilled and subsequently reused with a new charge of product, the removal of the tube facilitating the refilling thereof. It will be noted that the flange 14 extends slightly beyond the diametric limit of the neck 12 to provide a finger engaging surface whereby the tube may be gripped and removed from its seated position within the bottle.

The tube 13 in addition to providing a removable dispensing orifice for the bottle also serves as a means for metering the amount of liquid dispensed upon application of force to the sides of the bottle by limiting the extent to which the sides may be flexed by manually applied force. The tube being relatively more rigid than the sidewalls 6 of the bottle acts to resist the inward flexure of the sidewalls to an extent greater than that which will displace a predetermined amount of the fluid contents. As can be best seen in FIGS. 2 and 4, the sidewalls 6 of the bottle are formed with a recessed area 17 which may be of any suitable configuration, but shown herein in the shape of a teardrop, which recessed area embraces the minor axis of the bottle and extends over a substantial portion of the respective sidewalls 6, each recess being of a size sufficient to accommodate the fingertip of normal-sized adult persons and serves to guide the fingers of the user to the area of the sidewalls thus defined by the recess thereby serving as a pressure point identifying or locating means at which the squeezing forces should be applied in dispensing the contents from the container. Since the recesses are located along the minor axis of the bottle 5, as is also the limit tube 13, it will be apparent that regardless of the amount of pressure applied by the user the sidewalls will flex no greater than that permitted by the tube 13, thereby causing a uniform and metered amount of liquid to be dispensed upon each actuation of the device when operated to dispense the maximum of which it is capable in one actuation. In the event that it is desired to dispense a lesser amount than the maximum amount of which it is capable, the user may by applying a lesser force on the sidewalls in the area of the recesses 17 cause the device to dispense through orifice 15 one drop at a time, the dimensions of said orifice being so proportioned in relation to the viscosity of the contained liquid as to cause a drop-by-drop dispensing action upon application of a lighter force and to prevent any dispensing in the inverted position in the absence of any force applied to the sidewalls of the bottle 5.

In order to prevent accidental dispensing of the contents, a closure cap 20 is provided which, as can be seen in FIGS. 1, 3 and 6, includes sidewalls 21, endwall 22 and a top closure 23. The bottom edge 24 of the closure cap is adapted to seat on the step 9 formed in the side and endwalls of the body portion 5. Formed on the interior surface of the topwall 23 is a stopper 25 adapted to fit inside the dispensing orifice 15 with a snug friction fit and thereby seal the dispensing orifice when the cap is in closing position on the bottle. The closure cap is locked in sealing position on the bottle by means of flanges 26 formed on the interior surfaces of the sidewalls 21 and cooperating with lugs 27 formed on the exterior surface of the bottle neck 12. The flanges 26 as well as the lugs 27 are slightly beveled so as to serve as locking threads for securing the cap in position when it is twisted or rotated so as to align the major and minor axis thereof with those of the bottle 5. The lugs 27 are disposed on diametrically opposed sides of the neck 12 so as to allow clearance for the flanges 26 when the cap is initially placed over the dispensing orifice in an angularly rotated disposition about 90° from its aligned position relative thereto. When in this angularly displaced position the bottom edge 24 of the closure cap will be limited by the upper surface portion or vertex of the shoulder 11 extending along the major axis of the bottle, and then as subsequently rotated into alignment with the bottle the closure cap will gradually be lowered into its seated position on the step 9 while at the same time the flanges 26 engage with the lugs 27 and in so doing the stopper 25 will be inserted by a twisting action into the dispensing orifice to provide a liquid seal for same, as aforesaid, with a minimum amount of applied force. Conversely, upon removal of the cap in preparation for dispensing of the contents, a twisting force applied thereto in either direction relative to the container body 5 will cause the bottom surface 24 of the cap to engage in a camming action with the elongated surface or vertex of the shoulder 11 extending along the major axis of the container body to gradually elevate same and withdraw the stopper 25 from the dispensing orifice while at the same time unlocking the flanges 26 from engagement beneath the lugs 27, thus enabling separation of the relatively snug fitting parts, i.e., the stopper 25 with the dispensing orifice with a minimum of applied force. The closure cap 20 may be formed of any suitable material having sufficient rigidity to maintain it in locking engagement with the lugs on the neck of the associated bottle 5, the material preferably being of plastic such as polyethylene or the like. Preferably, the closure cap is also provided with strengthening struts 28 bracing the endwalls 22 with the top closure surface thereof to afford additional rigidity for the top closure structure.

Figure 8:
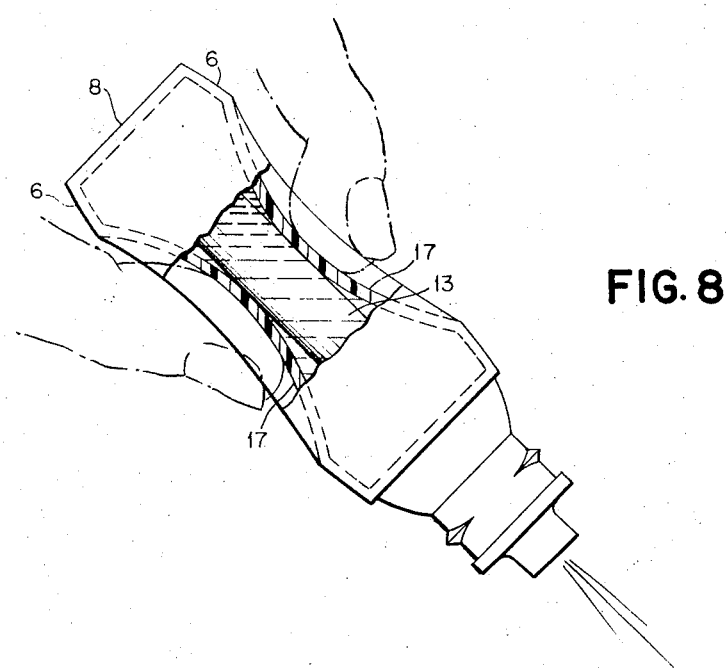
FIG. 8 is an operational view of the device when actuated to dispense a predetermined or metered amount of the contained product in a stream.

FIGS. 7 and 8 are operational views illustrating the manner in which the device may be manually actuated in dispensing the contents thereof. In FIG. 7 the container is shown in a substantially inverted position with finger pressure applied at the recessed pressure locating areas 17 of the sidewalls but with relatively slight force just sufficient to displace the liquid contents in a drop-by-drop manner. It will be noted that under such a relatively light force the recessed areas 17 are inwardly flexed but not to the extent wherein they are limited by the inner dispensing tube 13. As this relatively light pressure or force is applied, the dispenser will continue to dispense in a drop-by-drop manner until the recessed areas 17 of the sidewalls are brought to bear against the inner dispensing tube 13 at which time the additional resistance offered thereby will limit further flexure of the sidewalls and the drop-by-drop dispensing of the contained product will terminate.

FIG. 8 illustrates the operation upon application of an initial force sufficient to cause the recessed areas 17 of the sidewalls to limit against the interior dispensing tube 13. When a force of this magnitude is applied, the product will be dispensed in a stream of a predetermined metered quantity, the same quantity being dispensed each time that the device is so actuated. The total amount or quantity of the product dispensed in a drop-by-drop manner during any one uninterrupted actuation thereof will equal the amount dispensed in a stream in the manner indicated in FIG. 8 since in either case the displacement of the product caused by the limited extent of flexure of the sidewalls of the container, as determined by the dispensing tube, will be the same. This results from the fact that although the container or bottle is of oval cross section, the point at which the force is applied is predetermined as a result of the recessed area in the sidewalls which forms a natural and finger-conforming surface at which the user is induced to exert the force which reduces the interior volume to displace the contents in whatever dispensing mode may be desired.

While there has been shown and described what is considered to be a preferred embodiment of the invention, it will of course be understood that obvious variations in form could be made from the specific form herein shown and described without departing from the spirit of the invention. It is therefore intended that the invention be not limited to the exact form herein shown and described nor to anything less than the whole of the invention herein disclosed as hereinafter claimed.

What is claimed and desired to be secured by Letters Patent is:

1. A liquid metering container comprising a liquid retaining bottle generally oval in horizontal cross section and having semi-rigid sidewalls inwardly flexible upon application of force thereto, a neck disposed concentrically about the vertical center line axis of said bottle and formed with a dispensing orifice dimensioned to enable discharge of the liquid contents of said bottle only upon application of force to said sidewalls, an inclined shoulder portion extending between the walls of said bottle and said neck, a closure cap formed for locking engagement with said neck and having a bottom edge conforming to the oval cross-sectional contour of the walls of said bottle, said cap being formed to seal said orifice when in locking engagement with said neck, and means for locking said cap in engagement with said neck, said locking means including interior flanges on the opposed sidewalls of said cap and radially projecting lugs on said neck extending in the direction of the minor axis of said bottle, each flange cooperating with a respective one of said lugs to retain said cap in seated position on said bottle covering said neck, the vertex of said inclined shoulder portion extending along the major axis of said bottle providing a camming surface cooperating with the bottom edge of said cap to guide said cap into and out of said locking engagement by application of a twisting movement of said cap relative to said bottle about said center line axis.

2. The invention according to claim 1 wherein said bottle is formed with a peripheral step at the juncture of said shoulder portion with said walls providing a seat for the bottom edge of said cap when in locking engagement with said neck.

3. The invention according to claim 1 wherein said cap is formed with a stopper disposed to seat within said dispensing orifice when said cap is in seated position on said bottle and in locking engagement with said neck.

4. The invention according to claim 1 wherein each sidewall of said bottle is formed with a recessed portion extending over an area including the minor axis of said bottle, said recessed areas defining force-applying surfaces of a size and shape contoured to accommodate the fingers of the user to induce the application of force along the minor axis of said bottle when dispensing said contents.

5. The invention according to claim 1 wherein said dispensing orifice is formed at one end of a removable tube fitted to said neck and extending interiorly of said bottle in concentric relation to said center line axis, said tube having an apertured peripheral wall enabling the flow of said liquid into the interior of said tube at any level thereof relative to said tube, said tube being more rigid than said bottle to constitute a limit to the extent of flexure of the sidewalls of said bottle.

6. The invention according to claim 5 wherein said dispensing orifice is dimensioned to dispense said liquid contents drop-by-drop in response to gradual application of a force on said sidewalls less than the force required to flex said sidewalls into limiting engagement with said tube and to dispense said liquid contents in a stream in response to sudden application of a force sufficient to flex said sidewalls into limiting engagement with said tube.

7. The invention according to claim 6 wherein said tube comprises an open-ended hollow member the wall of which is formed with an axially extending slot to constitute said apertured periphery.

References Cited

UNITED STATES PATENTS

| | | |
|---|---|---|
| 1,104,607 | 7/1914 | Berger. |
| 1,617,545 | 2/1927 | Salpas. |
| 2,476,155 | 7/1949 | McKelvey _____ 215—46 XR |
| 2,571,504 | 10/1951 | Vuillemenot _____ 222—212 X |
| 2,734,665 | 2/1956 | Flamm _____ 222—212 X |
| 2,738,107 | 3/1956 | Graham _____ 222—211 |
| 2,989,203 | 6/1961 | Bremming _____ 220—40 X |
| 3,063,601 | 11/1962 | Hertz _____ 222—215 X |
| 3,064,844 | 11/1962 | Hoffmann _____ 215—46 X |
| 3,088,634 | 5/1963 | Rosekrans et al. ___ 222—211 X |
| 3,118,573 | 1/1964 | Johnson _____ 222—212 |

WALTER SOBIN, *Primary Examiner.*